United States Patent
Goodes et al.

(10) Patent No.: US 10,185,837 B2
(45) Date of Patent: *Jan. 22, 2019

(54) SYSTEM AND METHOD FOR ENCAPSULATING AND ENABLING PROTECTION THROUGH DIVERSE VARIATIONS IN SOFTWARE LIBRARIES

(71) Applicant: IRDETO B.V., Hoofdorp (NL)

(72) Inventors: Grant Stewart Goodes, Manotick (CA); Clifford Liem, Ottawa (CA)

(73) Assignee: IRDETO B.V., Hoofdorp (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,605

(22) Filed: Oct. 8, 2017

(65) Prior Publication Data

US 2018/0032746 A1 Feb. 1, 2018

Related U.S. Application Data

(63) Continuation of application No. 13/634,388, filed as application No. PCT/CA2010/000451 on Mar. 31, 2010, now Pat. No. 9,892,272.

(51) Int. Cl.
*G06F 21/00* (2013.01)
*G06F 21/62* (2013.01)

(52) U.S. Cl.
CPC .. *G06F 21/6209* (2013.01); *G06F 2221/2145* (2013.01); *G06F 2221/2149* (2013.01)

(58) Field of Classification Search
CPC ......... G06F 21/6209; G06F 2221/2145; G06F 2221/2149
See application file for complete search history.

(56) References Cited

U.S. PATENT DOCUMENTS 6,920,143 B1 * 7/2005 Ortiz ................. H04M 3/42323
370/389
7,472,375 B2 12/2008 Ye et al.
(Continued)

FOREIGN PATENT DOCUMENTS

| CA | 2 792 782 C | 1/2018 |
| CN | 102947835 A | 2/2013 |

(Continued)

OTHER PUBLICATIONS

First Office Action received in corresponding Chinese Application No. 201080065896.1, dated Nov. 24, 2014, 17 pages.
(Continued)

*Primary Examiner* — Ghodrat Jamshidi
(74) *Attorney, Agent, or Firm* — Rimon, P.C.; Marc S. Kaufman

(57) ABSTRACT

A flexible software library in which the software modules are defined as an abstract intermediate representation. The flexible library allows security transformation and performance attribute selections to be made by the end-user, rather than the library creator. Furthermore, since the flexible library contains an abstract representation of the software modules, the library can also be provisioned to contain an arbitrary number of named instances, representing specific sets of values for security and performance decisions, along with the corresponding native object-code resulting from those decisions. This permits distribution of software modules in a completely platform-independent manner while avoiding the disclosure of proprietary information, such as source-files.

22 Claims, 6 Drawing Sheets

(56) References Cited

U.S. PATENT DOCUMENTS

| | | | |
|---|---|---|---|
| 9,892,272 B2 | 2/2018 | Goodes et al. | |
| 2004/0158820 A1* | 8/2004 | Moore | G06F 8/51 |
| | | | 717/136 |
| 2004/0260933 A1 | 12/2004 | Lee | |
| 2005/0102649 A1 | 5/2005 | Hogg et al. | |
| 2005/0235357 A1* | 10/2005 | Gagnon | G06F 21/10 |
| | | | 726/22 |
| 2005/0262502 A1 | 11/2005 | Lari et al. | |
| 2008/0127056 A1 | 5/2008 | Java et al. | |
| 2008/0127171 A1* | 5/2008 | Tarassov | G06F 8/60 |
| | | | 717/174 |
| 2009/0249374 A1* | 10/2009 | Hepper | G06F 8/71 |
| | | | 719/332 |
| 2010/0313189 A1 | 12/2010 | Beretta et al. | |
| 2011/0066844 A1* | 3/2011 | O'Toole, Jr. | G06F 21/10 |
| | | | 713/153 |
| 2011/0088022 A1* | 4/2011 | Kruglick | G06F 8/443 |
| | | | 717/153 |
| 2011/0314459 A1 | 12/2011 | Husbands | |

FOREIGN PATENT DOCUMENTS

| | | |
|---|---|---|
| EP | 2 553 571 A1 | 2/2013 |
| GB | 2 420 638 A | 5/2006 |
| JP | 2006-338190 | 12/2006 |
| JP | 2009-009537 | 1/2009 |
| JP | 5555803 B2 | 7/2014 |
| KR | 2014-0053757 | 5/2014 |
| WO | 2011/120123 A1 | 10/2011 |

OTHER PUBLICATIONS

Second Office Action received in corresponding Chinese Application No. 201080065896.1, dated Sep. 1, 2015, 8 pages.

Notification of Grant Patent Right for Invention received in corresponding Chinese Application No. 201080065896.1, dated Jan. 29, 2016, 3 pages.

Communication pursuant to Article 94(3) EPC in corresponding European Application No. 10848642.4, dated Mar. 30, 2017, 4 pages.

Communication pursuant to Article 94(3) EPC in corresponding European Application No. 10848642.4, dated Jun. 14, 2018, 5 pages.

Anonymous: "Multi-Architecture Builds", Dec. 1, 2002, retrieved from https://web.archive.org/web/20021201165251%20/http://make.paulandlesley.org:80/multi-arch.html, retrieved on Jul. 25, 2018, 14 pages.

Anonymous: "Use a single Visual Studio solution to build both x86 and x64 at the same time?—Stack Overflow", retrieved from https://stackoverflow.com/questions/1574075/use-a-single-visual-studio-solution-to-build-both-x86-and-x64-at-the-same-time/1580825#1580825, retrieved on Jul. 25, 2018, 7 pages.

Anonymous: "Hardening—Debian Wiki", Aug. 31, 2009, retrieved from https://web.archive.org/web/20090831045018/http://wiki.debian.org:80/Hardening, retrieved on Jul. 25, 2018, 7 pages.

Office Action received in corresponding Japanese Application No. 2013-501568, dated Feb. 4, 2014, 4 pages.

Decision to Grant received in corresponding Japanese Application No. 2013-501568, dated May 27, 2014, 6 pages.

Notification of Reason for Refusal received in corresponding Korean Application No. 10-2012-7028138, dated Aug. 31, 2016, 5 pages.

Notification of Reason for Refusal received in corresponding Korean Application No. 10-2012-7028138, dated Apr. 28, 2017, 4 pages.

Grant of Patent received in corresponding Korean Application No. 10-2012-7028138, dated Oct. 27, 2017, 2 pages.

Examination Report cited in corresponding Canadian Application No. 2,792,782 dated Apr. 6, 2016.

European Search Report in corresponding European Application No. 10848642.4 dated Apr. 7, 2014.

Collberg et al., "A Taxonomy of Obfuscating Transformations", Technical Report #148, Department of Computer Science, University of Auckland, Private Bag 92019, Auckland, New Zealand, 1997 http:/fwww_cs_arizona_edu/~collberg/Research/Publication/CollbergThomborsonLow97a/A4_pdf, *Part 6 "Control transformations"; Part 7 "Data Transformations".

Forrest et al., "Building Diverse Computer Systems", The Sixth Workshop on Hot Topics in Operating Systems, IEEE, pp. 67-72, May 1997.

International Search Report and Written Opinion issued in corresponding International Application No. PCT/CA2010/000451 dated Nov. 18, 2010, 7 pages.

International Preliminary Report on Patentability issued by WIPO dated Oct. 11, 2012 in connection with international Patent Application No. PCT/CA2010/000451, 6 pages.

Non-Final Office Action received in corresponding U.S. Appl. No. 13/634,388, dated May 22, 2014, 14 pages.

Final Office Action received in corresponding U.S. Appl. No. 13/634,388, dated Dec. 18, 2014, 14 pages.

Non-Final Office Action received in corresponding U.S. Appl. No. 13/634,388, dated Mar. 10, 2016, 17 pages.

Final Office Action received in corresponding U.S. Appl. No. 13/634,388, dated Oct. 20, 2016, 26 pages.

Notice of Allowance received in corresponding U.S. Appl. No. 13/634,388, dated Jul. 6, 2017, 8 pages.

* cited by examiner

SYSTEM AND METHOD FOR ENCAPSULATING AND ENABLING PROTECTION THROUGH DIVERSE VARIATIONS IN SOFTWARE LIBRARIES

CROSS-REFERENCE TO RELATED APPLICATION

This application is a Continuation of U.S. application Ser. No. 13/634,388 filed on Sep. 12, 2012 which is a national stage entry of international application Ser. No. PCT/CA10/00451 filed on Mar. 31, 2010, the disclosure of which is incorporated herein by reference.

FIELD OF THE INVENTION

The present disclosure is directed to methods and systems for protecting software from tampering. In particular, the present disclosure is directed to a method and system for protecting software libraries.

BACKGROUND OF THE INVENTION

Software libraries have traditionally been used to encapsulate sub- or partial-programs prior to full application deployment. A software library provides a set of well-defined Application Program Interfaces (APis), and comprises an implementation of specific functionality, invokable via those APis. The library is packaged as a single entity.

The library model has a number of benefits. These include the ability to permit multi-party development, since a library separates the originating software party from the integrating software party, encapsulating the partially complete software in a reusable module. Encapsulation of software in modular libraries also encourages the re-use of code. And, although not a specific design requirement, libraries also permit a degree of source code protection as they are pre-compiled, usually object form, modules. However, a determined attacker may be able to reverse-engineer the executables that are created from the library.

The software library model has had little innovation since the 1970's and 80's. Traditional software libraries typically contain object-code, which is very close to executable instructions, apart from a few higher-level concepts such as relocatable symbols. The nature of such object-code necessitates that the library creator statically determine, at library creation-time, most executable aspects of the code, including security and performance attributes, before distribution to the end-user. Additional tooling, in the form of a linker or dynamic loader, makes it possible to build an executable application which incorporates the functionality of the software library by relocating the object-code into the address space of the application executable (see e.g. J. Levine, Linkers and Loaders, Morgan Kaufmann Publishers, 2000).

It is therefore desirable to provide a library format that allows the bulk creation of diverse binaries that are resistant to reverse-engineering.

SUMMARY OF THE INVENTION

The present disclosure provides a method of creating a library of software modules containing multiple diverse instances of the software modules. The method can be embodied as a computer program product.

The method comprises generating an abstracted intermediate representation of the software modules from library source-code files. Generation of the intermediate representation can, for example, include discarding lexical and syntactical content, where the lexical and syntactical content includes platform-dependent content or platform-independent content. The intermediate representation can be encrypted, such as by using symmetric key encryption. The intermediate representation is then packaged with metadata describing security and optimization defaults for security and optimization transformations to be applied to the software modules. A plurality of diverse instances of the software modules are then generated by applying distinct security and optimization transformations to the intermediate representation to generate each instance, and the plurality of diverse instances are packaged in a software library. The method can further comprise compiling the source-code instance to generate an object-code instance of the software modules.

The generation of the plurality of diverse instances of the software modules can comprise performing, for each diverse instance, steps of applying a distinct set of security and optimization transformations to the intermediate representation; and converting the instance of the intermediate representation to a source-code instance of the software modules. Application of the security and optimization transformations, such as program transformations, in particular data-flow and/or control-flow transformations, can comprise applying security and optimization transformations determined by user-supplied security and optimization decisions, and can further comprise determining if the user-supplied security and optimization decisions are consistent with the security and optimization defaults.

A plurality of diverse object-code instances, and metadata describing the security and optimization transformations applied to each instance, can be packaged in the software library. The method can further comprise linking one of the plurality of object-code instances to a compiled application object-file to provide an executable program image, and can further comprise determining whether the distinct security and optimization transformations applied to the object-code instance are consistent with security and optimization transformations applied to a second object code instance, such as by comparing metadata describing the security and optimization transformations applied to each instance.

The method can further comprise constraining distinct security and optimization transformations in view of security and optimization transformations applied to a library having a second intermediate representation.

BRIEF DESCRIPTION OF THE DRAWINGS

Embodiments of the present disclosure will now be described, by way of example only, with reference to the attached Figures.

DETAILED DESCRIPTION

Figure 1:
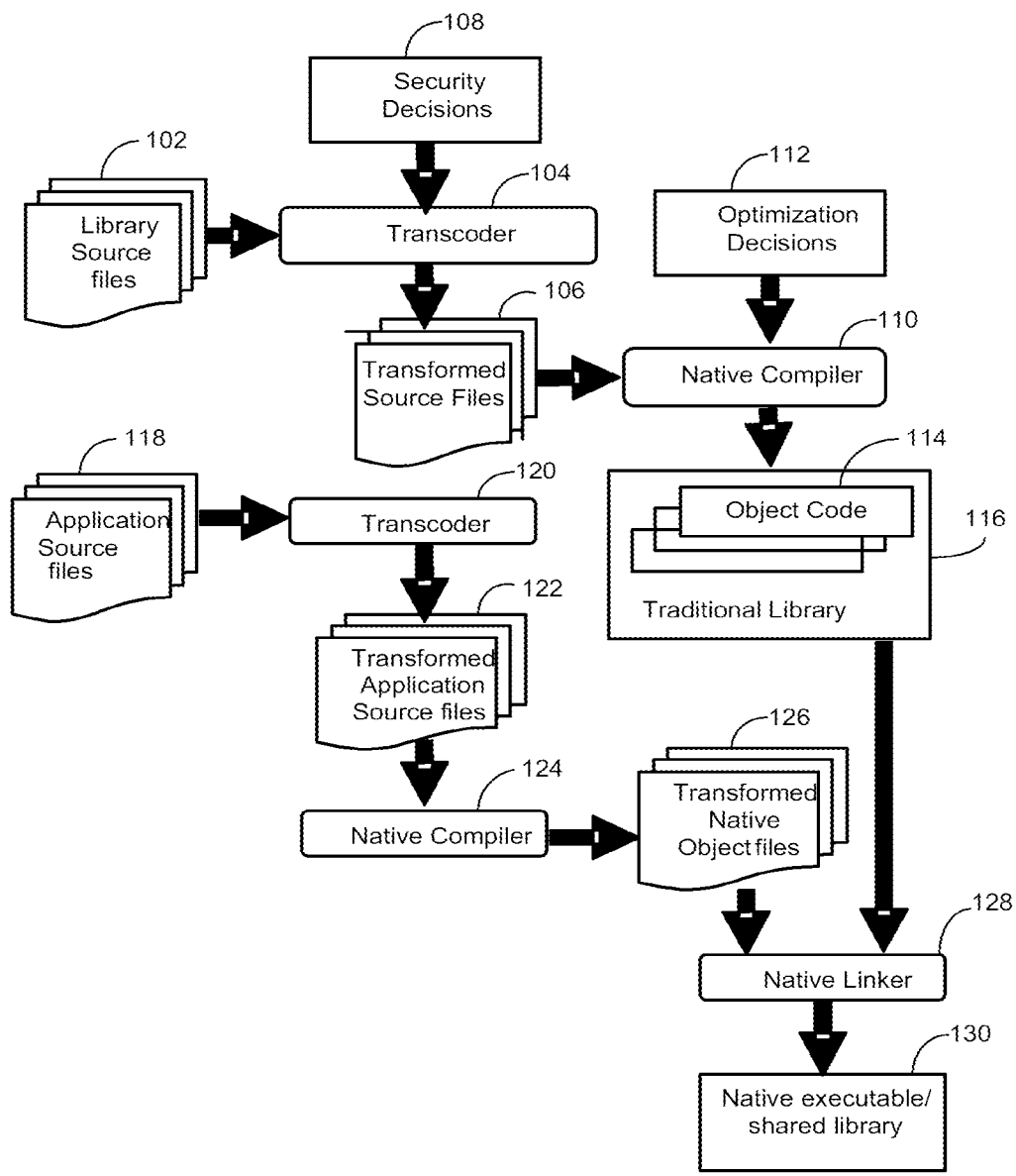
FIG. 1 shows a prior art creation of a software library having security transformation.

Generally, the present invention provides an improved software library model, and method of its creation. A "flexible" library, which defines the packaging of software into modules using an abstract intermediate representation, is disclosed. The flexible library can allow selection of security transformations and performance attributes to be made by the end-user (the integrating party), rather than the library creator. Furthermore, since the flexible library contains an abstract representation of the software modules, the library can also be provisioned to contain an arbitrary number of named "instances" representing specific sets of values for security and performance decisions, along with the corresponding native object-code resulting from those decisions. The collection of software modules can be packaged in the form of a flexible library that permits security transformations and performance optimizations to be chosen by the end-user rather than the creator of the software modules, and furthermore permits distribution of software modules in a completely platform-independent manner while avoiding the disclosure of proprietary information, such as source-files. One advantage of the flexible library format is that it can be provisioned into a wholly contained, unlimited number of diverse instances providing the ability to create differing executables that resist differential attacks. In traditional software libraries, comprised of static object-code, the exact implementation supplied by the library is fixed. Decisions relating to the security and performance of the implementation are made before the library is created, and cannot be changed by the end-user (the integrating software party). If it is desired to add security through the application of diverse program transformations, the library creator is required to create and distribute multiple diverse copies of the software library, since each copy can only incorporate one set of security and performance decisions. In addition, the security decisions for the library do not take into account the exact nature of the application code that will eventually be invoking the library APis, since the application has not necessarily been written at the time of library creation. As a result, the library creator either has to make security decisions that are completely generic (i.e. that are consistent with arbitrary invocation contexts), or make assumptions about the nature of the invocation context, and consequently limit the ways in which the library can be used.

A further limitation of traditional software libraries is that object-code is inherently targeted to a single platform, typically a combination of the hardware architecture and the operating system. This is generally true even if the source-code for the software library itself has been written in a completely platform-independent fashion. If it is desired to provide a software library which is portable, in other words, that can be used on arbitrary combinations of hardware architecture and operating system, the end-user is forced to rebuild the library on the platform of choice, using platform-specific compiler and library tooling. This necessitates the distribution of the library source-code, which is unacceptable for at least two reasons. First, it exposes the proprietary information of the software library, such as the source code, algorithms and design choices of the library creator; and second, it burdens the end-user with the need to understand the details of how to build the library itself.

To protect software in hostile environments, program transformations have been shown to be an effective approach to resistance to reverse engineering and tampering attacks to software. Additionally, the diversification of such security transformations can be a further barrier to differential attacks, collusion, and other comparison threats. A large plurality of program instances reduces an attacker's ability to retrieve program information purely through comparison means. The method and system of the present disclosure can apply both program transformation and diversification to software libraries.

FIG. 1 shows the typical workflow of creating and using a traditional software library incorporating security transformations. The library source-files 102, or library modules, are first processed by a "transcoder" 104, which does source-to-source translation of the library modules 102, generating transformed source-files 106 that incorporate security and optimization transformations, such as program transformations, based on user-determined security decisions 108. For example, U.S. Pat. No. 6,594,761, issued Jul. 15, 2003 and U.S. Pat. No. 6,842,862, issued Jan. 11, 2005, describe data flow transform techniques that can be used to protect software; and U.S. Pat. No. 6,779,114, issued Aug. 17, 2004, describes control flow transform techniques that can be used to protect software. The contents of each of U.S. Pat. No. 6,594,761, U.S. Pat. No. 6,842,862 and U.S. Pat. No. 6,779,114 are incorporated herein by reference in their entirety.

The transformed source-files are then processed by the native compiler 110, generating object-code that incorporate speed/size performance tradeoffs base on user-determined optimization decisions 112. The resulting native object-code 114 is packaged and distributed as a software library 116, which is then immutable as far as the end-user (the integrating software party) is concerned. A similar process is applied to application source-files 118, or application modules. The application modules 118 are input to a transcoder 120 to generate transformed application source files 122, based on security decisions, (not shown) provided by the integrating party. The transformed files 122 are compiled by a native compiler 124 to provide transformed native object files 126. The transformed native object files 126 and the library 116 are then listed by a native linker 128 to provide a native executable 130, or a shared library. If the security and performance decisions of the software library need to be revisited, the library will have to be re-built and re-distributed.

Figure 2:
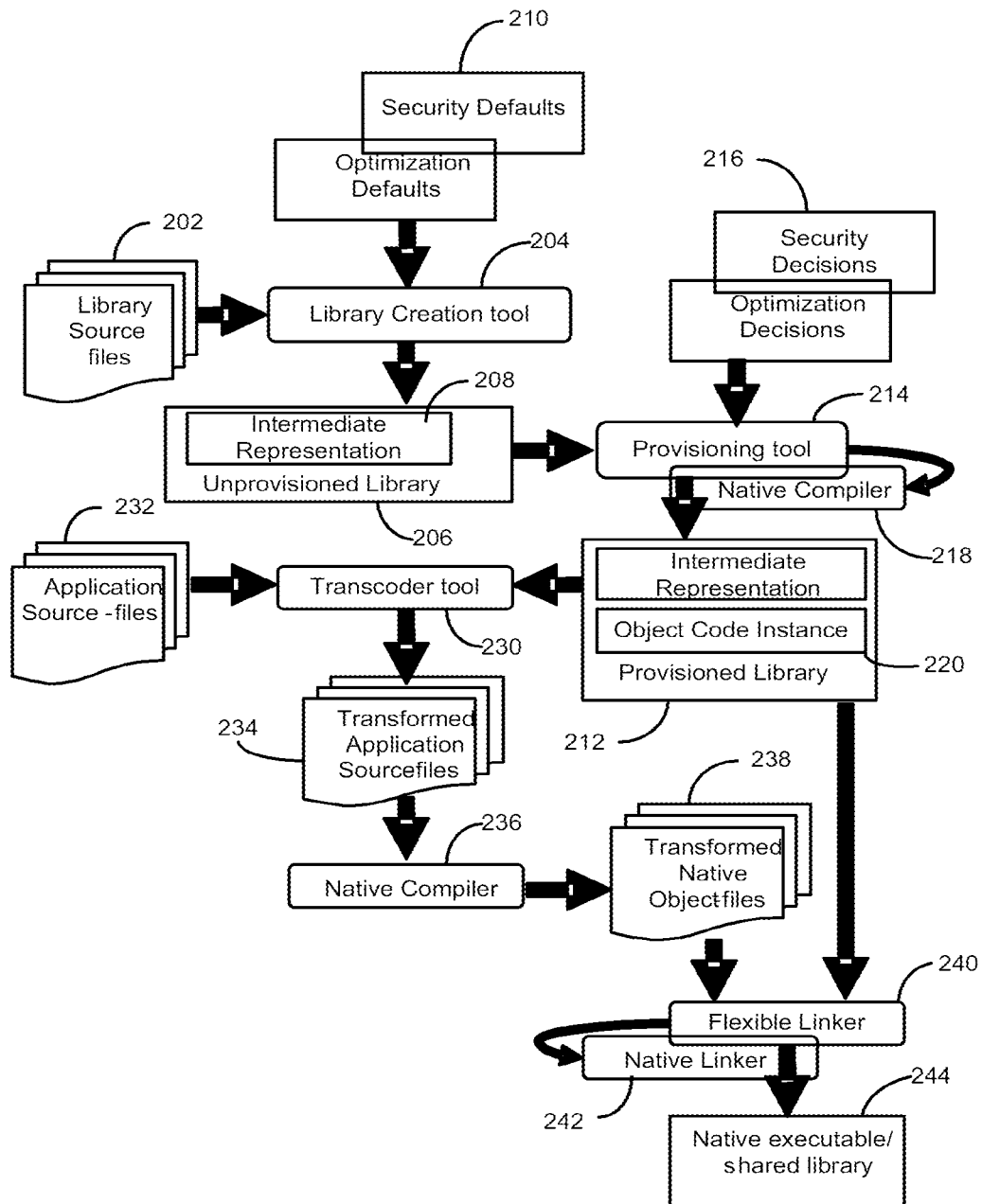
FIG. 2 shows creation of a software library according to the present invention.

FIG. 2 shows the workflow in creating and using a flexible library software library according to the present disclosure. First, the library source-files 202 are processed by a flexible library creation tool 204, which includes transcoding capabilities. Rather than generating transformed source-files, an unprovisioned flexible library 206 is created. The unprovisioned flexible library 206 contains an intermediate representation 208 of the source files. The intermediate representation contains configuration parameters 210, such as default values and/or range-limits for both security and optimization decisions. The configuration parameters 210 may be specified (on a per-source-file or global basis), and are recorded in the flexible library 206, along with the intermediate representation 208 of the original source-files 202.

The distributed "unprovisioned" flexible library 206, as built by the library creator 204, is not in a state which can directly be used by the end-user to create an executable application, since it only includes the abstract intermediate representation 208 of the library implementation, and does not include object-code. The intermediate representation 208 fully encapsulates all "front-end" aspects of traditional compilation, including the result of any high-level language pre-processing, such as conditional compilation, include-files, etc, and the full content of all source files 202. The intermediate representation 208 is fully portable, in that target machine/platform dependencies, such as the content and layout of files in the file-system, are eliminated, which makes it possible to distribute and use the flexible library 206 without access to the original library build-environment. The intermediate representation 208 is akin to standard compiler representations, containing high-level assembly code for an infinitely capable target processor. Furthermore the intermediate representation 208 contains extensions for security-oriented program transformations, such as the data-flow and control-flow transformations referenced above, which can apply to specific entities in the program code. The abstract intermediate representation 208 is combined with configuration parameters 210 regarding default values, option ranges, and the like to form the unprovisioned flexible library 206.

Since the unprovisioned flexible library 208 distributes proprietary information from the library creator to an integrating party, the proprietary information should preferably be protected. The disclosed solution can use an encryption scheme to protect an unprovisioned library. Both the intermediate representation and configuration parameters can be encrypted using a symmetric key cipher (e.g. AES) at library creation time. Such an implementation can make use of White-Box Cryptography (see U.S. Pat. No. 7,397,916, issued Jul. 8, 2008, and U.S. application Ser. No. 11/020,313, filed Dec. 10, 2001, the contents of which are incorporated herein by reference in their entirety) to conceal keys during execution. Furthermore, at provisioning time, the unencrypted intermediate representation 208 is never in plain sight. The intermediate representation 208 is in a transformed and encrypted state upon use in the provisioning stage. This encrypted state can use a randomly generated session key.

Figure 3:
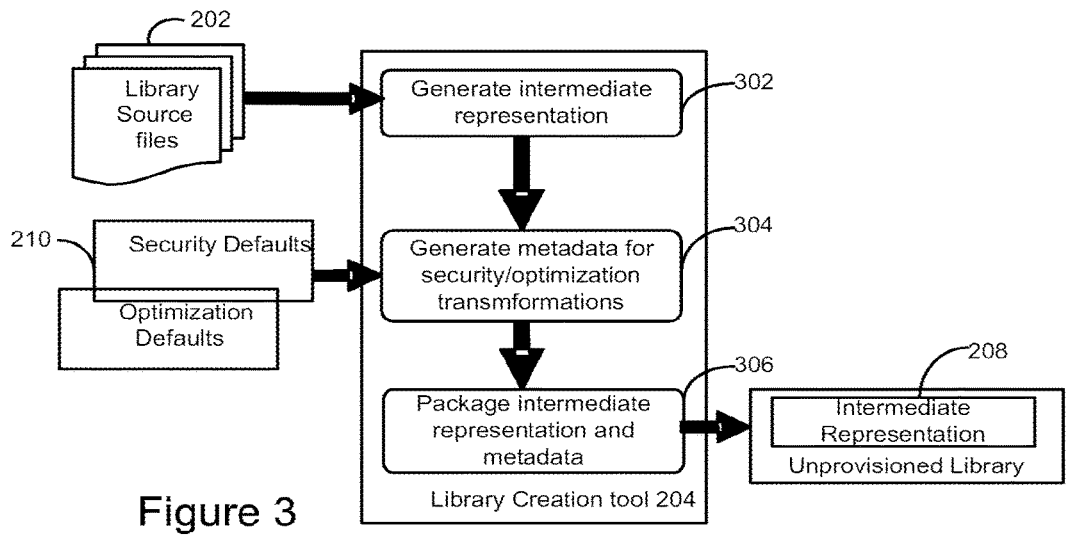
FIG. 3 shows operation of the flexible library creation tool.

As shown in FIG. 2, unprovisioned flexible libraries 206 are created by a dedicated flexible library creation tool 204. The inputs to the flexible library creation tool 204 are a set of library source-files 202, and optionally, a set of security and optimization defaults 210. FIG. 3 illustrates the workflow performed by the flexible library Creation tool in detail. The library source-files 202 are first processed to generate the abstract representation 208 that fully captures the semantic content of the source-files 202, while discarding most lexical and syntactic aspects, such as, for example, platform-dependent aspects such as the location of included files on the machine's file-system (step 302). The abstract representation 208 is sufficiently detailed that it can fully reconstitute source-code of precisely equivalent functionality, without reference to the original source-code itself.

The library creator then has the option of providing configuration parameters 210, such as default values, range-limits, or locked values, for both security and optimization parameters. These values are converted to metadata, which will reside in the unprovisioned flexible library 206, and will later be combined with input from the user of the flexible library to determine a final set of security and optimization decisions. Finally, the abstract representation and the metadata are packaged together as a single file, which is now the unprovisioned flexible library 206.

The process of selecting security and optimization decisions, applying them to the abstract representation, and generating object-code is called "provisioning", and results in a "provisioned" flexible library 212. This function is performed by the flexible library provisioning tool 214, which takes as input the unprovisioned flexible library 206, a set of security and optimization decisions 216, and a native compiler 218. The default and/or range-limits chosen as configuration parameters 210 can be combined with the security and optimization decisions 216 of the provisioning step to determine the final security and optimization criteria. This provides convenience to the end-user, in that the library creator can provide sensible default values for security/optimization criteria, minimizing the amount of detail that must be specified when provisioning, and prevents specification of incorrect/undesirable security/optimization criteria, via range-limits and/or locked values that may be provided to forbid specific provision-time values, e.g. completely turning off security transformations for a secure library. It has the additional benefit that critical sections of the software which incorporate sensitive proprietary information can be protected against reverse-engineering by the end-user since they can be forced to have sufficient levels of security transforms to prevent such attacks.

Figure 4:
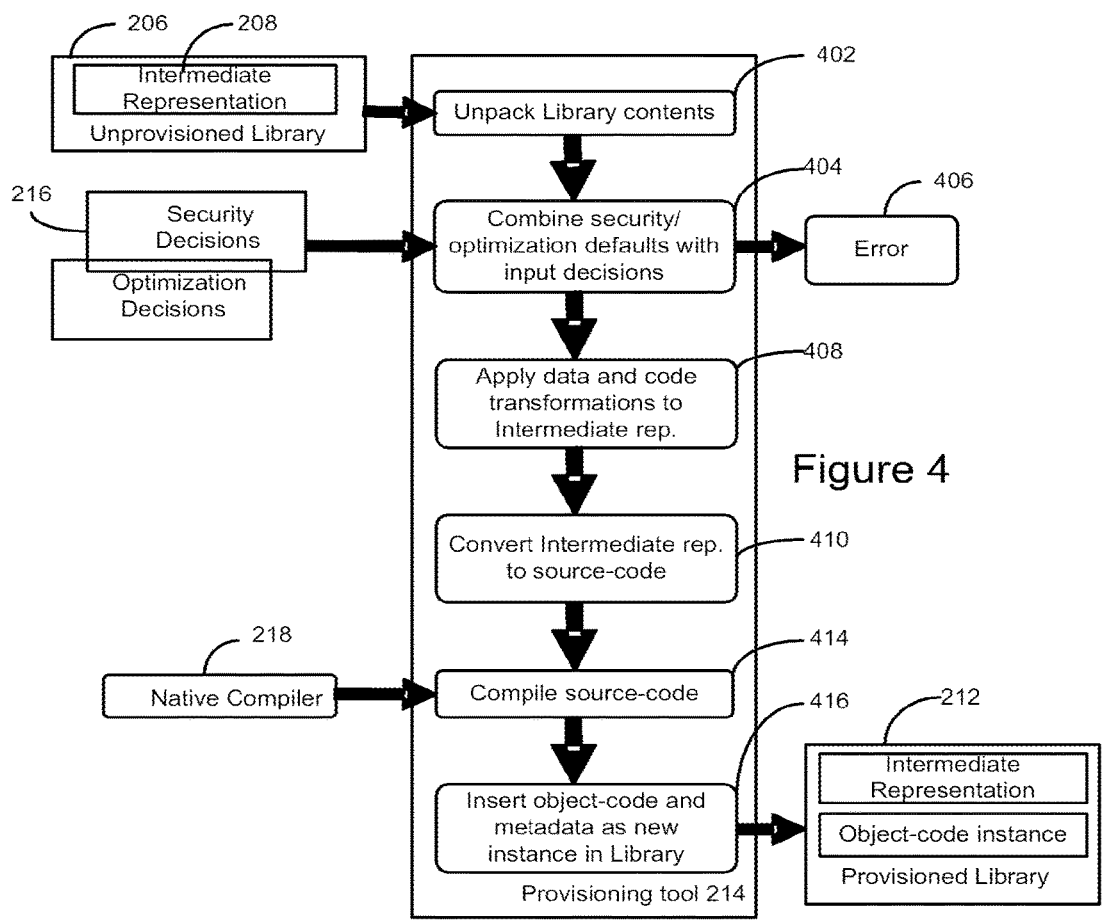
FIG. 4 shows operation of the provisioning tool.

FIG. 4 illustrates the workflow performed by the flexible library provisioning tool 214 in greater detail. The flexible library contents are first unpacked, and in particular, the abstract representation of the library and associated metadata are extracted (step 420). Next, any user-selected security and optimization decisions 216 are combined with the configuration parameters 210, such as defaults, range-limits, and locked values determined by the library creator and described in the flexible library metadata included in the unprovisioned flexible library 206 (step 404). At this point, it is possible that the user-selected security/optimization decisions 216 may be in conflict with the constraints imposed by the library creator, in which case an error notification 406 can be issued and the provisioning halted. Assuming the security/optimization decisions 216 are consistent with the metadata constraints, a final set of security/optimization decisions is constructed by combining them with the default and range-limits from the metadata (step 408).

The abstract representation 208 is then processed to apply program transformations, such as code and data transforms, as determined by the set of security decisions generated in step 408 (step 410). The processed abstract representation is then converted to source-code (step 412). The result of this is a set of transformed source-code, which can then be compiled by the native-compiler 218 supplied by the user to generate a set of object-code (step 414). Note that the optimization decisions generated above can be used as options to the native-compiler, allowing the user to tune performance parameters of the resulting object-code.

Finally, the object-code, along with metadata describing the precise parameters of the program transformations, in particular data- and code-transformations, applied, is stored as a provisioned instance 220 in the flexible library file 212 (step 416). Each flexible library instance 220 can be provided with a unique name, selected by the user, allowing the coexistence of multiple provisioned instances, each with different program 20 transformations, in particular data- and code-transformations.

Diversity is supported by the flexible library in a straightforward manner, since the end-user may provision arbitrarily many instances, each with slightly different sets of security decisions, and all of these diverse instances may be stored in a single flexible library simply by giving them unique instance names.

Traditional software libraries utilizing object-code are inherently tied to a single target platform, and have to be re-built if they are to be re-targeted to another platform. The use, in a flexible library, of an abstract representation for the library implementation means that it is possible to provide a flexible library that can be utilized on arbitrary target platforms, as determined by the end-user, after the flexible library has already been distributed. To accomplish this, the library source-code must be written in a platform-independent manner (such as the ISO C-90 dialect of the C programming language). Since the generation of object-code (see step 414), which is obviously platform-dependent, is not performed until provisioning-time, and is dependent on the native compiler selected by the user, it is possible for the flexible library to be provisioned with multiple distinct instances for multiple platforms.

Figure 5:
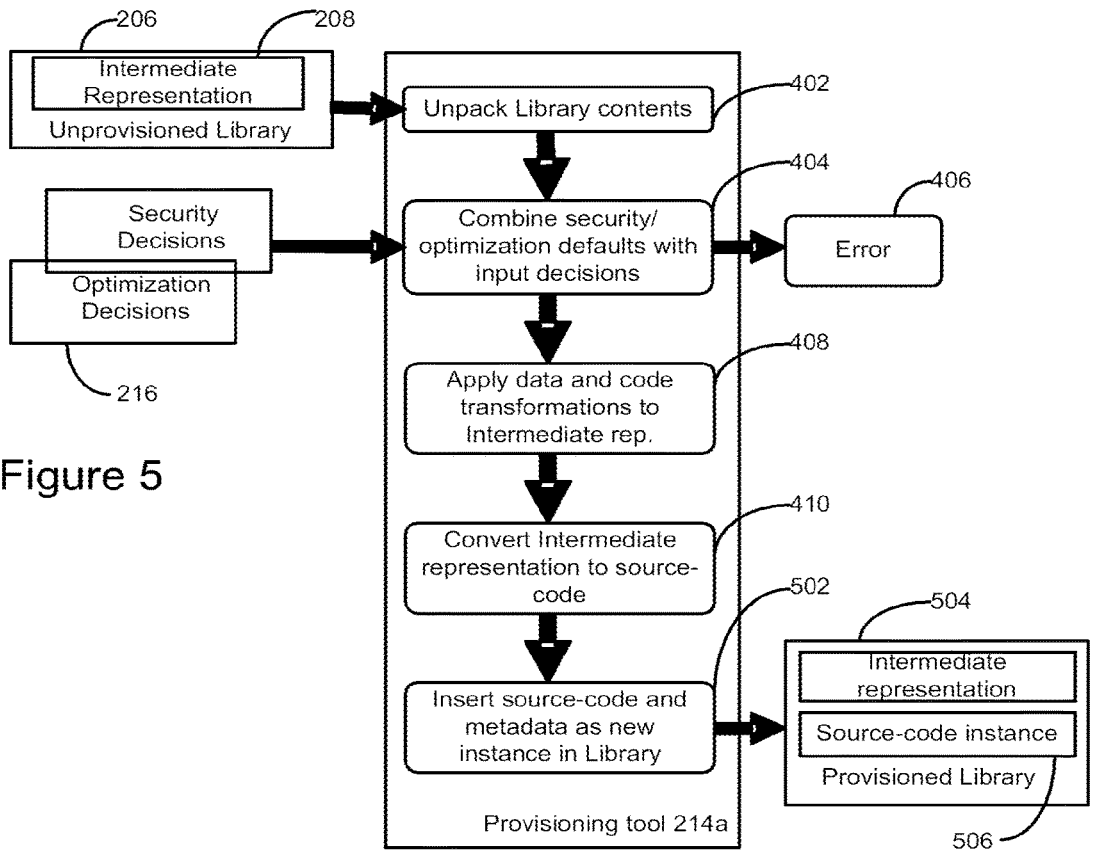
FIG. 5 shows a further embodiment of operation of the provisioning tool.

Additionally, the flexible library can be implemented in a mode where the native compiler is not involved at all. As shown in FIG. 5, the provisioning process implemented by provisioning tool 214a can be interrupted after generation of the transformed source-files (see steps 402-412), and the native-compilation step 414 omitted. Instead, at step 502, the transformed source-code and metadata can be inserted into a provisioned flexible library 504. The resulting flexible library instance 506 contains transformed source-code, rather than object-code, along with metadata describing the transformations that were applied. The provisioned flexible library 504 containing diverse instances 506 contains security transformed source code that can be later processed by 10 a native compiler, outside of the flexible library context. This is an added flexibility to the model that has benefits for an application targeted to multiple platforms.

The flexible library also supports the ability to apply security transformations across the boundary of the library, extending into the calling application code, and taking into account the nature of that calling code. Traditional software libraries can only support an API which is fixed, since correct functioning of application code is ensured by adherence to the library API as described in fixed header-files. The flexible library model allows each diverse instance of the provisioned library to have a different set of security transformations applied to the library API. This is accomplished by utilizing the metadata stored in provisioned flexible library instances that describe the precise parameters of all program transformations, in particular data- and code-transformations, applied, especially those that participate in the API of the library. If an application author wishes to make use of a flexible library with a transformed API, the application code can then be processed with the provisioned flexible library instance as an additional input to the source-to-source transcoder.

Figure 6:
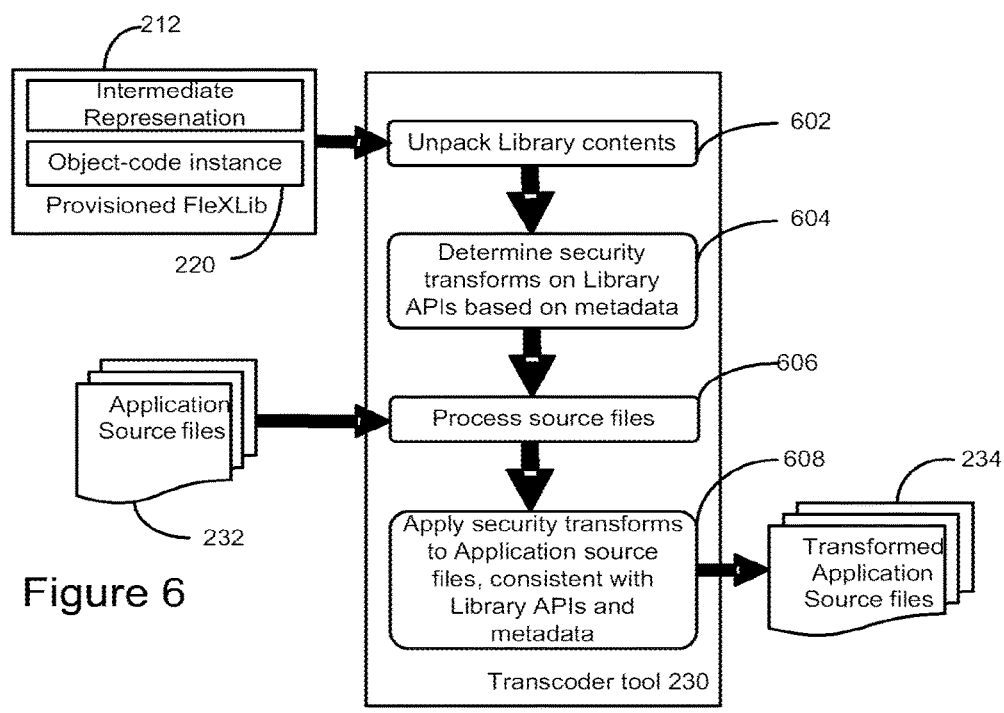
FIG. 6 shows operation of the transcoding tool.

FIG. 6 illustrates the functioning of the transcoder tool 230 (shown in FIG. 2) as it process application source-files in the presence of a flexible library. The transcoder tool 230 unpacks the metadata from a specified flexible library instance (step 602). The transcoder tool 230 can thus obtain and determine a complete description of the program transformations, in particular data- and code-transformations, that were actually applied to the library API (step 604). Once the application source-code files 232 have been processed by the transcoder tool 230 (step 606), corresponding transformations can be applied to the application source code files 232 to ensure that correct functioning is maintained (step 608), resulting in correctly functioning application source files 234. As shown in FIG. 2, the transformed application source files 234 can be compiled by a native compiler 236 to provide transformed native object-code files 238. The modifications to a known transcoder, such as those described in U.S. Pat. No. 6,594,761, U.S. Pat. No. 6,842,862 and U.S. Pat. No. 6,779,114, are relatively minor, since the application of the transformation is just an extension of existing mechanisms to "force" external security transformations to specific values which support multiple, separate transcoding domains. The advantage of the flexible library approach is that it is both convenient to use, since the flexible library maintains the information, not the user, and less error-prone, since the metadata is referred to by the flexible library instance-name, which will also be used to refer to the transformed object-code at link-time.

Figure 7:
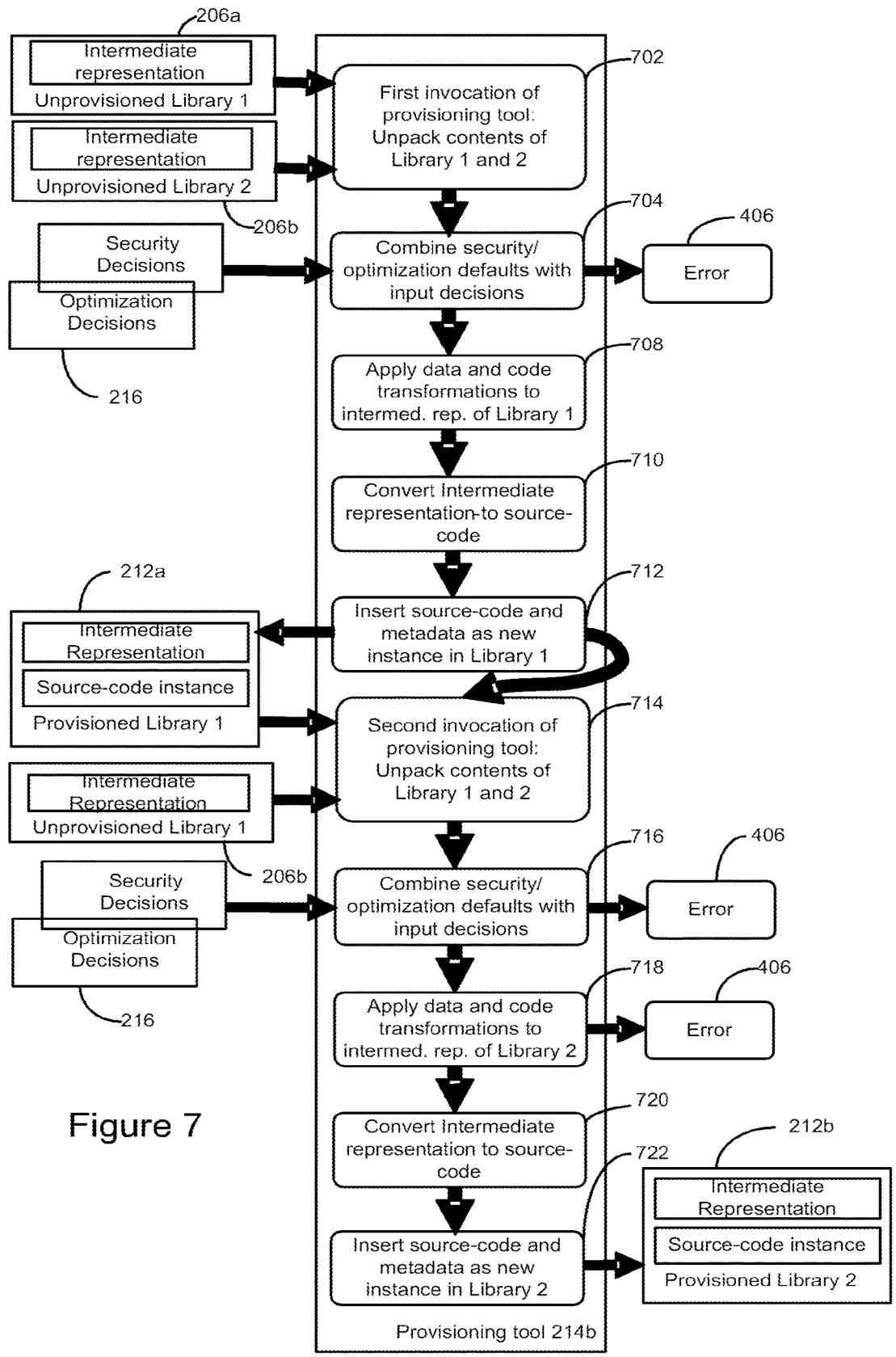
FIG. 7 shows provisioning of multiple, independent flexible libraries.

The flexible library can be extended to handle multiple, interdependent flexible libraries, such that even though the libraries invoke each other's interfaces, suitable security transforms can be chosen to cover all the flexible libraries in a consistent manner. In fact, the application code itself can be packaged as an interdependent flexible library, allowing the security transformations on the all involved flexible libraries to take into account the nature of the application code using those libraries. This is supported by provisioning each interdependent flexible library against all the other flexible libraries, so that metadata describing security transforms across the library APis can be read in and taken into account by the flexible library provisioning tool 214b, as shown in FIG. 7.

The process for provisioning multiple, interdependent, flexible libraries is very similar to provisioning of a single flexible library, except that multiple flexible libraries 206a, 20Gb are passed to the provisioning tool 214b. Each flexible library is provisioned in turn, but the security transforms applied are constrained to be consistent with each of the other flexible libraries, as described by the metadata stored in each instance. The first flexible library is provisioned (steps 702-712) as described above in relation to FIG. 5, and a new provisioned instance 212a is created. The second flexible library is then provisioned (steps 714-722), with the security transforms from the first flexible library being taken into account (see step 714). This forces any program transformations, in particular data- or code-transformations, across the API between the first and second flexible libraries 212a, 212b to be applied in a consistent manner. This process may be extended to arbitrarily many interdependent flexible libraries.

In order to generate an executable application using a provisioned flexible library, another tool, the flexible library linker 240 (see FIG. 2), is utilized. The flexible library linker 240 is responsible for verifying the consistency of the application code and the flexible library instance from the provisioned flexible library 212, unpacking the appropriate object-code, and invoking a native linker 242 to generate a final executable 244.

Figure 8:
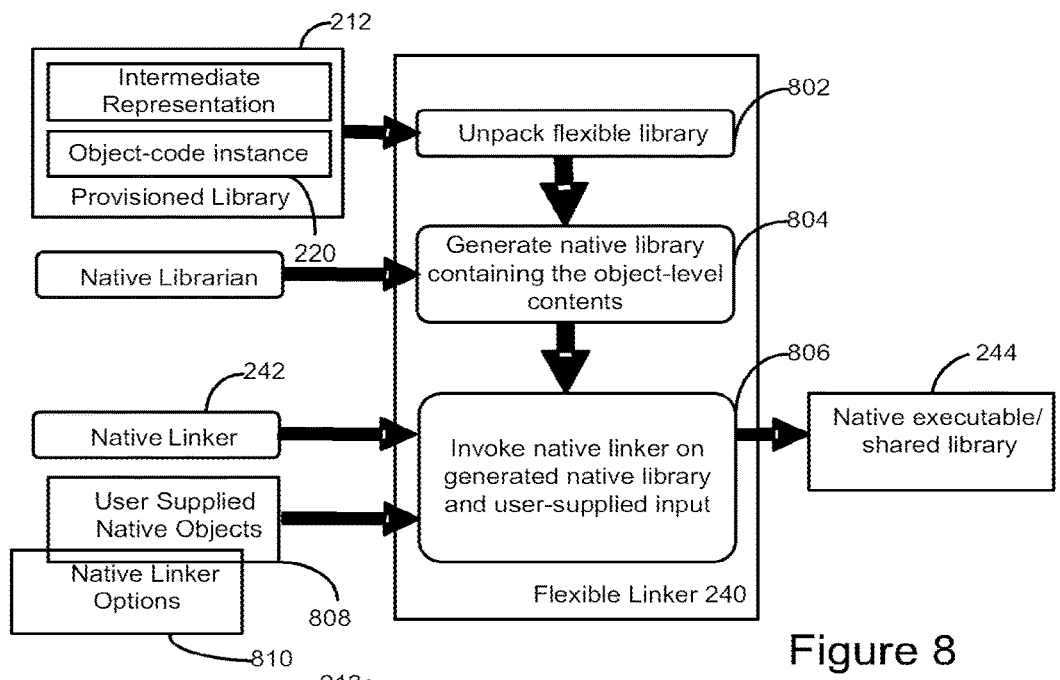
FIG. 8 shows operation of the flexible library linker.
Figure 9:
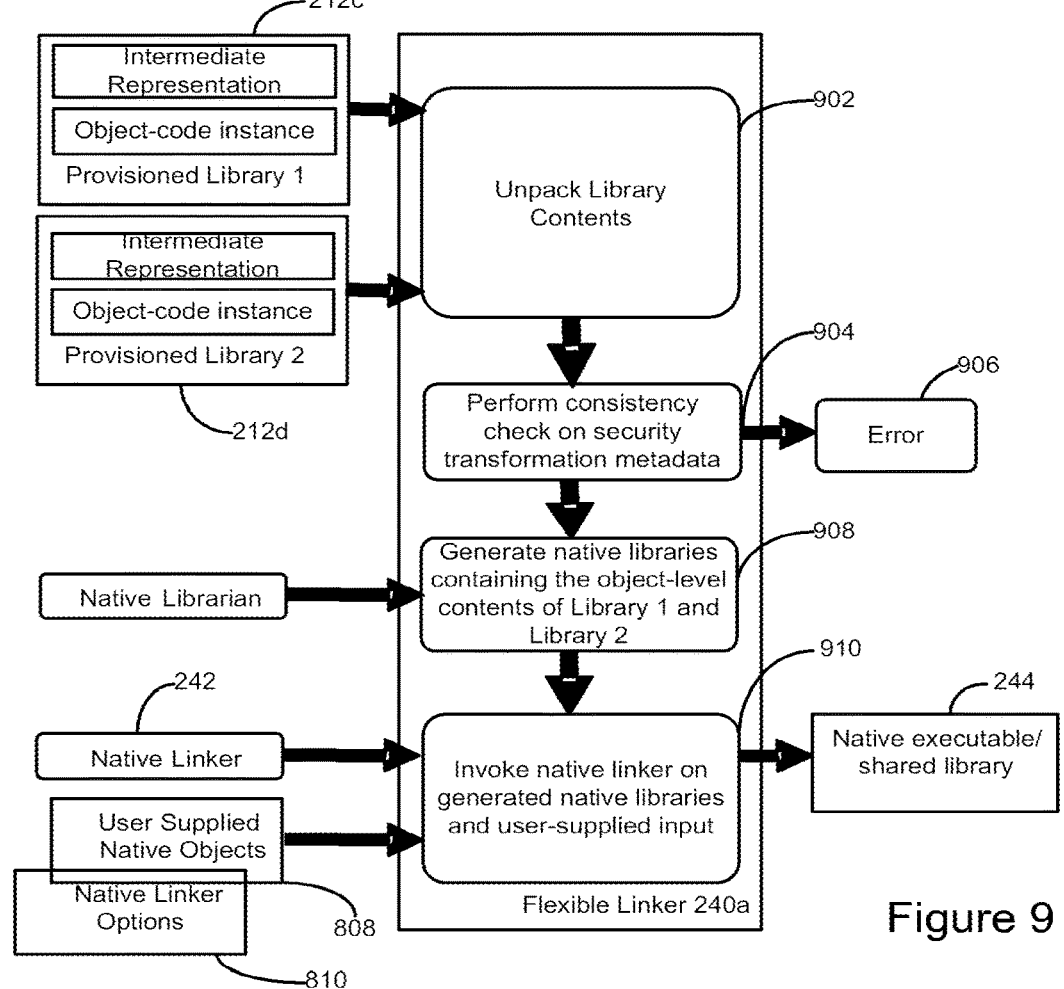
FIG. 9 shows operation of the flexible library linker with multiple libraries.

FIG. 8 illustrates the operation of the flexible library linker 240 in greater detail. The flexible library linker 240 takes as its command-line the full set of native-linker options that the user would provide if they were building their application with a native linker, though any flexible libraries can be separately identified as such by using special syntax which gives both the flexible library filename and the desired instance-name. Any flexible library involved is first unpacked (step 802), and the specified instance 220 (from among many provisioned instances) is extracted. The object-code in the specified instance is then packaged as a temporary native library (step 804) by invoking a native librarian tool Finally, the native linker 242 is invoked (step 806), passing in appropriate native 10 linker options 803, and any user specified native objects 810, such as object-code, libraries, and options, along with the temporary native-libraries corresponding to each flexible library as generated in step 804, to generate the native executable 244. In this way, linking with flexible libraries is transparently equivalent to linking with native libraries. The flexible library linker 240 can be much more powerful than a native linker, 15 since it can detect erroneous uses of security transforms that would normally result in an executable application that simply failed to execute properly. It can do this because the provisioned flexible library instances store metadata describing the exact nature of the program transformations, in particular data- and code-transformations, that were applied by the transcoder tool 230, particularly those which affect the APis at the library boundary. Taking advantage of this feature of the flexible library linker 240 requires the use of multiple flexible libraries, such as when the application code and the library code are in separate flexible libraries. FIG. 9 illustrates the operation of the flexible library linker 240a when multiple flexible libraries are in use. As described above in relation to FIG. 8, the flexible linker 240a, unpacks the contents of multiple provisioned flexible libraries 212c, 212d (step 902). Consistency checking of the security transformation metadata can then be performed (step 904). If no error 906 is indicated, native libraries can be generated (step 908) and linked (step 910) as described above.

Flexible libraries can support three general use-cases, in increasing order of sophistication. In a first use-case, securing of application code (transcoding) and provisioning of the flexible library are performed independently. The library API is either not transformed, or is transformed in a "fixed" manner, which may be described to the application code via external metadata. In a second case, application code is transcoded with reference to a previously provisioned flexible library. The library API can be arbitrarily transformed, and the application will correctly take account of the transformations for each API invocation, but the nature of application does not affect library transformations. In a third use-case, both the application code and the library modules are in the form of flexible libraries, and both flexible libraries are provisioned together. Thus, the library and application code are secured/transformed in a completely integrated manner.

Traditional software libraries can only support the first use-case, and then only partially: The traditional library creator can select a fixed-set of security and optimization decisions and incorporate these into a distributed library. However, this is inferior to the flexible library model, since the end-user cannot modify these security and optimization decisions. Further, the flexible library model adds support for diversity, which could only be achieved using traditional software libraries if the library creator created and distributed multiple, diverse instances of the library. Diversity means the creation of differing programs by randomly choosing the program transformations, in particular data and control-flow transformations, that are applied to the program code. For each transformation applied, the choices of transform family and sets of characteristic constants are selected randomly, driven through a seeded Pseudo Random Number Generator (PRNG). In addition to these internal program transformations, data transformations at the interface (i.e. API) of the library may also be selected randomly.

Thus, as will be apparent from the preceding description, the described flexible library has a number of advantages over conventional libraries. Security transformations and performance optimizations for an implementation may be selected, within bounds set by the library creator, at the discretion of the end-user (the party integrating the library into an application). This allows the end-user to perform security versus performance tuning. If the library source-code is written in a portable language dialect (such as ISO C), and care is taken to avoid dependencies on platform-specific APis, the resulting flexible library can be provisioned to arbitrary platforms, and will be fully portable. This allows for target-independent libraries to be distributed. A flexible library may contain multiple provisioned instances, each reflecting different sets of security and optimization decisions. This supports both tuning of security/performance tradeoffs, since a single flexible library can contain multiple instances exploring a range of security and performance decisions settings, and diversity, since, a single flexible library can contain a multitude of instances, each having a unique set of security transformations. A flexible library can also provide protection of proprietary information, since the abstract representation can be encrypted, and thus will not expose the library source-code to unintended recipients. Multiple interdependent flexible libraries may be utilized, particularly encapsulating the application code in flexible library form, allowing security transforms that take into account the application context. The flexible library provisioning tool 214 and linker tool 240 can also be used to detect many sorts of errors, such as mismatches of security transforms across API boundaries, etc., that would previously have only shown up as runtime errors.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, 10 hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A method executed by one or more computing devices for generating an executable application using a provisioned flexible software library the method comprising:
    accessing a flexible software library containing an intermediate representation of one or more library source-code files and metadata corresponding to a plurality of security and optimization parameters, wherein values of the plurality of security and optimization parameters determine transformations to be applied to the intermediate representation;

unpacking the metadata from an instance contained inside the flexible software library;

determining, based upon the metadata, program transformation parameters applied to an API of the flexible software library;

determining, based upon the parameters, corresponding transformations to be applied to source-code files corresponding to the executable application;

applying the corresponding transformations to the source-code files corresponding to the executable application to create correctly functioning transformed application source-code files; and compiling the transformed application source-code files with a native compiler to create native object code files.

2. The method of claim 1, wherein the determining comprises determining a complete description of the program transformations that were applied to the API of the flexible software library.

3. The method of claim 1, wherein there are multiple interdependent flexible software libraries and each flexible software library can invoke interfaces of other libraries.

4. The method of claim 3, wherein the application source-code is packaged as an interdependent flexible library, to thereby allow the security transformations on the all involved flexible libraries to take into account the nature of the application source-code using those libraries.

5. The method of claim 4, wherein each interdependent flexible software library is provisioned against all the other flexible software libraries, so that metadata describing security transforms across the APIs of the flexible software libraries can be read in and taken into account for provisioning.

6. An apparatus for generating an executable application using a provisioned flexible software library the apparatus comprising:

at least one processor; and at least one memory operatively coupled to the at least one processor and having instructions stored thereon which, when executed by the at least one processor, cause the at least one processor to:

access a flexible software library containing an intermediate representation of one or more library source-code files and metadata corresponding to a plurality of security and optimization parameters, wherein values of the plurality of security and optimization parameters determine transformations to be applied to the intermediate representation;

unpack the metadata from an instance contained inside the flexible library; determine, based upon the metadata, program transformation parameters to be applied to an API of the flexible software library;

determine, based upon the parameters, corresponding transformations to be applied to source-code files corresponding to the executable application;

apply the corresponding transformations to the source-code files corresponding to the executable application to create correctly functioning transformed application source code files; and compile the transformed application source-code files with a native compiler to create native object code files.

7. The apparatus of claim 6, wherein the determining comprises determining a complete description of the program transformations that were applied to the API of the flexible software library.

8. The apparatus of claim 6, wherein there are multiple interdependent flexible software libraries and each flexible software library can invoke interfaces of other libraries.

9. The apparatus of claim 8, wherein the application code is packaged as an interdependent flexible software library, to thereby allow the security transformations on the all involved flexible software libraries to take into account the nature of the application code using those libraries.

10. The apparatus of claim 9, wherein each interdependent flexible software library is provisioned against all the other flexible software libraries, so that metadata describing security transforms across the APIs of the flexible software libraries can be read in and taken into account for provisioning.

11. A method executed by one or more computing devices for creating at least one software library, the method comprising:

generating, by at least one of the one or more computing devices, an intermediate representation of one or more library source-code files;

packaging, by at least one of the one or more computing devices, the intermediate representation with metadata corresponding to a plurality of security and optimization parameters, wherein values of the plurality of security and optimization parameters determine transformations to be applied to the intermediate representation;

generating, by at least one of the one or more computing devices, a plurality of diverse object code instances of a library software module corresponding to the one or more library source-code files, wherein the plurality of unique object code instances are generated by applying each of a plurality of unique sets of transformations to the intermediate representation, wherein each unique set of transformations in the plurality of unique sets of transformations corresponds to a unique set of values of the plurality of security and optimization parameters;

packaging, by at least one of the one or more computing devices, the plurality of unique object code instances in the software library; and linking one of the plurality of object code instances to a compiled application object-file to provide an executable program image.

12. The method of claim 11, wherein the linking comprises checking for a match of security transformations between the one of the plurality of object code instances and the compiled application object file based on the metadata corresponding to the one of the plurality of object code instances.

13. The method of claim 11, wherein multiple interdependent software libraries are created, and the transformations applied to each library are constrained to be consistent with the other libraries.

14. The method of claim 13, wherein the linking comprises linking one of the plurality of object code instances from each of the multiple software libraries to a corresponding compiled application object-file to provide an executable program image.

15. The method of claim 11, wherein each of the plurality of unique sets of transformations are selected, based upon security requirements, from within bounds set by a flexible software library creator.

16. The method of claim 11, wherein the unique set of values of the plurality of security and optimization parameters are selected randomly.

17. An apparatus for creating at least one software library, the apparatus comprising:
- at least one processor; and
- at least one memory operatively coupled to the at least one processor and having instructions stored thereon which, when executed by the at least one processor, cause the at least one processor to:
  - generate, by at least one of the one or more computing devices, an intermediate representation of one or more library source-code files;
  - package, by at least one of the one or more computing devices, the intermediate representation with metadata corresponding to a plurality of security and optimization parameters, wherein values of the plurality of security and optimization parameters determine transformations to be applied to the intermediate representation;
  - generate, by at least one of the one or more computing devices, a plurality of diverse object code instances of a library software module corresponding to the one or more library source-code files, wherein the plurality of unique object code instances are generated by applying each of a plurality of unique sets of transformations to the intermediate representation, wherein each unique set of transformations in the plurality of unique sets of transformations corresponds to a unique set of values of the plurality of security and optimization parameters;
  - package, by at least one of the one or more computing devices, the plurality of unique object code instances in the software library; and
  - link one of the plurality of object code instances to a compiled application object-file to provide an executable program image.

18. The apparatus of claim 17, wherein the linking comprises checking for a match of security transformations between the one of the plurality of object code instances and the compiled application object file based on the metadata corresponding to the one of the plurality of object code instances.

19. The apparatus of claim 17, wherein multiple interdependent software libraries are created, and the transformations applied to each library are constrained to be consistent with the other libraries.

20. The apparatus of claim 19, wherein the linking comprises linking one of the plurality of object code instances from each of the multiple software libraries to a corresponding compiled application object-file to provide an executable program image.

21. The apparatus of claim 17, wherein each of the plurality of unique sets of transformations are selected, based upon security requirements, from within bounds set by a flexible software library creator.

22. The apparatus of claim 17, wherein the unique set of values of the plurality of security and optimization parameters are selected randomly.

* * * * *